United States Patent
VanCleave et al.

(10) Patent No.: US 7,561,182 B2
(45) Date of Patent: Jul. 14, 2009

(54) FRAUD IDENTIFICATION AND RECOVERY SYSTEM

(75) Inventors: James VanCleave, The Colony, TX (US); David C. Wood, Dallas, TX (US)

(73) Assignee: Spectrum Tracking Systems, Inc., Carrollton, TX (US)

( * ) Notice: Subject to any disclaimer, the term of this patent is extended or adjusted under 35 U.S.C. 154(b) by 939 days.

(21) Appl. No.: 10/716,928

(22) Filed: Nov. 19, 2003

(65) Prior Publication Data

US 2005/0046697 A1 Mar. 3, 2005

Related U.S. Application Data

(60) Provisional application No. 60/499,658, filed on Sep. 3, 2003.

(51) Int. Cl.
*H04N 7/18* (2006.01)
(52) U.S. Cl. ........................ 348/150; 235/380
(58) Field of Classification Search ................ 348/150, 348/78, 159, 169, 170, 171, 172, 143, 148, 348/153, 152, 179, 14, 151, 154, 14.07, 14.03, 348/14.01, 161; 382/103, 16, 10, 25; 235/379, 235/380, 381, 382; 705/43, 35, 44, 39, 42, 705/8, 10, 14
See application file for complete search history.

(56) References Cited

U.S. PATENT DOCUMENTS 5,751,345 A * 5/1998 Dozier et al. ............... 348/153
5,915,246 A * 6/1999 Patterson et al. ............. 705/43
6,188,398 B1 * 2/2001 Collins-Rector et al. .... 345/327
6,553,178 B2   4/2003 Abecassis
6,583,864 B1 * 6/2003 Stanners ...................... 356/71
6,615,199 B1   9/2003 Bowman-Amuah
7,389,914 B1 * 6/2008 Enright et al. .............. 235/379
2003/0038756 A1 * 2/2003 Blume et al. .................. 345/36
2003/0060897 A1 * 3/2003 Matsuyama et al. ........... 700/1
2004/0164141 A1 * 8/2004 Egami et al. ................ 235/379

OTHER PUBLICATIONS

International Search Report mailed Feb. 23, 2005 related PCT/US04/28286 filed Aug. 31, 2004.

* cited by examiner

*Primary Examiner*—Behrooz Senfi
(74) *Attorney, Agent, or Firm*—Tucker Ellis & West LLP

(57) ABSTRACT

A terminal with a camera and an attention-getting or redirecting device. The attention-getting device delivers a message to attract the subject's attention, causing the subject to look toward it, while the camera obtains an image or multiple images. The camera may be hidden or, for a deterrence effect, visible to the subject. The attention-getting device may be of one or more various electronic devices, such as electronic or holographic displays, or displays employing motion and audio for capturing attention. Additional cameras may be utilized to compensate for very short or very tall people and for obtaining multiple views of the subject. The image is stored with the transaction data for quick retrieval.

3 Claims, 5 Drawing Sheets

FRAUD IDENTIFICATION AND RECOVERY SYSTEM

This application claims priority of U.S. Provisional Application No. 60/499,658, filed Sep. 3, 2003.

BACKGROUND OF THE INVENTION

The present invention relates generally to video surveillance systems and more particularly to video surveillance systems for fraud investigation, fraud deterrence, and customer interaction in financial, retail, and other transactions.

Financial institutions and retail outlets, both large and small, suffer very large financial losses due to check fraud, credit card fraud, and fraud from other financial instruments at the checkout or bank teller stations.

To date, it has been very difficult for fraud investigators to solve these non-violent crimes because the only tools available have been those used for violent crimes such as robbery, customer disturbances, etc. In fact, attempted use of such tools, such as Closed Circuit Television ("CCTV") system photo images, have been discounted or disallowed in courts because the photos have been from distances too far away to provide positive identification or have not used "zoom" cameras to capture high resolution photo-images sufficient for identification. CCTV photo-images (photographs) often provide a general description of perpetrators, but are rarely suitable for clear identification. Cameras on back walls and ceilings do not show the detail needed for a identification and are often at the wrong angles. Perpetrators often disguise themselves or hide below baseball caps and wigs to cause further identity confusion. Therefore, for many fraud investigations, photo images from violent crime or shoplifting investigation systems are not even reviewed.

A useful and significant element of a personal transaction is the time that a client or customer, or perhaps a perpetrator of a crime, must wait for the transaction to be completed, whether the transaction is occurring at a checkout or point of sale terminal, at an automated teller machine, at a bank teller window, drive-up window, or other such transaction location. This time period usually occurs while the checkout clerk or teller is completing the transaction. Today, this time period is not usually used by retailers, banks, or others to provide overt marketing messages, news, individual customer loyalty messages, or other information to the waiting customer. And such customer may be a perpetrator of fraud or other crime.

Thus the need exists for systems at such transaction points that can both obtain images of sufficient quality for positive identification and utilize the time period a customer or perpetrator must wait for a transaction to complete so as to obtain better images of potential crime perpetrators. Advertising, news, loyalty messages (interactive or not), or other information can use the transaction time to attract or divert the attention of a perpetrator to aid in providing better images of subjects by causing the subject to turn and/or tilt his/her head for additional mages at other angles. Such photo images will aid in identification.

BRIEF SUMMARY OF THE INVENTION

In view of the aforementioned, there is needed a system that is made up of one or more image input devices, such as, in this the preferred embodiment one or more cameras, either hidden, partially hidden, or even visible for a deterrence effect, combined with any number of types of devices that can deliver attention-getting messages or signals to the subject at the transaction location and the necessary support systems to operate them and store the subsequent information. In other words, a system is needed with a camera, or a plurality of cameras, capable of obtaining "close-up" or high resolution, identification photo images in combination with means of attracting subjects who may be crime perpetrators somewhat hidden by hats, caps, large glasses, disguises, etc, to look in the direction of the one or more cameras to obtain the photo images at that angle, along with obtaining close-up photo images at the normal transaction angle. The time during which subjects await the completion of a transaction aids the purpose of this system. Electronic systems, such as computers, video and digital recorders, and otherwise also aid in the operation of the system and the storage of transaction information, system information and photo images for subsequent retrieval. Also contemplated are stores' checkout registers, banks' teller terminals, ATMs, and other transaction devices as types of devices to activate the system and create the system transaction data to be stored. Devices of the invention for attracting subjects to turn, tilt, or angle their heads may be any of several various devices such as electronic displays or screens of various types, holographic or print displays, displays employing motion both for effect and capturing attention, certain audio devices, and other attention-getting and/or attention diverting methods. Contemplated for the invention is media content for displays (where used), which may be any appropriate kind, as well as the means to deliver the media content to the displays.

The present invention contemplates a system of such components housed either in one unit, or used as separately located components, or used in any combination of co-location and housing and/or interconnected to other systems' components to complete the operation of the invention.

In one example embodiment, the present invention contemplates a transaction system, such as a checkout register, teller terminal, automated teller machine, or automated checkout machine connected to an image input apparatus, typically a camera(s), an attention-getting or diverting apparatus, and a controller, or controllers, for activating the image input apparatus and the image output apparatus. The image output apparatus may be a visual or video display apparatus, such as a monitor, cathode-ray tube, flat panel display, closed circuit television, or the like. The attention-getting or diverting apparatus may be a visual or video display of many kinds, an audio output device, or an audiovisual system as well as the media content for display or sound or both.

The one or more controllers, may operate in several modes. For example, a controller can activate an advertising or other attention-getting apparatus prior to activating the image input apparatus. A controller may activate advertising apparatus and the image input apparatus at the same time. A controller may command advertising apparatus to display several different advertisements based on a variety of factors such as customer information or preferences, specials being offered by the vendor, or even interactive responses where two-way systems, such as touch screen displays or audio communications, are used. The image input apparatus may obtain several photo images, some at different angles, to increase the chances of obtaining a good image(s) for identification.

However, it is also contemplated that the attention-getting apparatus may operate independently from the image input device. It is further contemplated by one embodiment that both the image input device and the attention-getting apparatus can operate continuously, without individual activation other than simply being switched on.

A data input device may be included for obtaining transaction data from a user. For example with the typical automated teller machine the data input device would comprise a card reader for obtaining the customer's information and a keypad to enable the customer to enter a password or select various transaction parameters. Other types of data input devices such as voice activated, keyboard, or touch screen systems may also be employed. In another embodiment, a controller monitors for motion, general motion or specific motion, in the field of the image input device, e.g., camera, and activates the advertising apparatus and/or the image recording apparatus upon that motion.

In one embodiment, the controller monitors the data input device and upon commencement of processing transaction data, activates the advertising apparatus and the image recording apparatus.

Many embodiments contemplate that a database is communicatively coupled to the image input apparatus and the data input apparatus, and responsive to the controller(s). The database stores transaction data received by the data input device with images received by the image input apparatus. Thus, when a transaction is being reviewed, the corresponding image may be retrieved. Transaction data may either be imprinted on the corresponding image(s) and stored in the database or transaction data may be stored separately from the image but with a corresponding code or other means to conclusively link the transaction record and the stored image(s).

Another aspect of the present invention is a method for obtaining images corresponding directly with specific transactions, the steps comprising activating an advertising or information device, activating an image input device, and receiving transaction data. The advertising, information, or other attention-getting step may be performed prior to the activating an image input device step or may be synchronized. The transaction data is stored with, or corresponding to, the image obtained by the image input device. The advertising, information or attention-getting device may display a static image, play a video clip in motion, broadcast an audio signal, or broadcast an audio and visual signal.

Yet another aspect of the present invention is for an apparatus for storing transactional data and visual images comprising a data input apparatus, such as a touch screen, a keypad, a card reader, or a combination thereof, a first image input apparatus or any number of image input apparatuses, and a database communicatively coupled to the first image input apparatus and/or the other image input apparatuses, and responsive to the data input apparatus, the database storing transaction data received by the data input device with images received by the first image input apparatus or other image input apparatuses.

Another aspect of the present invention may be the use of facial recognition programs, in software or hardware, to activate the aforementioned apparatus(es) and systems.

Ordinarily the image input apparatus(es) are cameras. A first camera may be positioned along an axis so that a good image may generally be obtained of most subjects. Additional cameras may be used so that multiple frontal and side views are obtained, including very tall or very short subjects. The images are then stored with the transaction data enabling the images to be easily retrieved when reviewing the transaction data.

An aspect of the present invention is that a close-up photo image, or images, of each customer or perpetrator can be made. Another aspect of the present invention is that the camera can be below or close to the attention-getting device or display, hidden or not, being better enabled to obtain photo images under blocking methods like cowboy hats or the bills of baseball hats. Yet another aspect of the present invention is that the attention-getting or diverting device or display imparts marketing, selling, news, other information and/or entertainment messages for the benefit of the shop, store, bank, retail, or other establishment.

Still yet another aspect of the present invention is that the attention-getting device or display causes the customer to at least momentarily glance or look at it, increasing the probability of obtaining a high quality frontal and other image(s). The photo images may be taken by a camera and stored in a video recorder, either analog or digital. The specific transaction data from the customer's transaction is also captured so that specific transaction data such as date, time, amount, transaction number, etc. and the customer's image can be stored together or linked electronically or otherwise, facilitating the matching of images to the transaction for later retrieval and investigation. With the present invention, a fraud investigator, investigating either a potential or actual fraudulent transaction, can retrieve the transaction file and photo image, either separately or together.

The components and apparatuses described may be housed in a single housing, such as an all-encompassing checkout register machine or teller terminal, used separately, or housed in any combination.

Still other objects of the present invention will become readily apparent to those skilled in this art from the following description wherein there is shown and described a preferred embodiment of this invention, simply by way of illustration of one of the modes best suited for to carry out the invention. As it will be realized, the invention is capable of other different embodiments and its several details are capable of modifications in various aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings, incorporated in and forming a part of the specification, illustrate several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

The present invention, in one embodiment, is directed to a system including a terminal that can be used for a checkout counter, point of sale, automatic teller machine, teller window, drive up location or any other location where transactions are occurring. The terminal is comprised of a camera, an advertising, information, interactive or other attention-getting or diverting device, and is connected to the necessary support systems to operate both. The camera may be hidden, or for deterrence effect may be either partially hidden or wholly visible. Preferably the camera is positioned for close-up photo-images or photographs of the subject from an angle and/or frontal view to enhance the probability of identifying the subject. The advertising device may be any marketing message delivery type device, including but not limited to a display device, an audio device, an audiovisual device, a holographic or print device, or other device that may also be combined with an audio device. The support systems would typically include a controller that activates the advertising or attention-getting device to capture the subject's attention and direct the subject's gaze to it, while activating the camera(s) to obtain the photo-images. The photo-images are then stored with the transaction data for easy retrieval.

Other embodiments of the present invention incorporate a plurality of cameras and a database for storing transactional data and the photo-images obtained from the plurality of cameras. The plurality of cameras may be located in order to capture multiple views, each view at a different angle. The cameras may also be used with an advertising or other attention-getting or diverting device to capture the subject's attention, which could enable the cameras to simultaneously obtain frontal and angled views of the subject.

Figure 1:
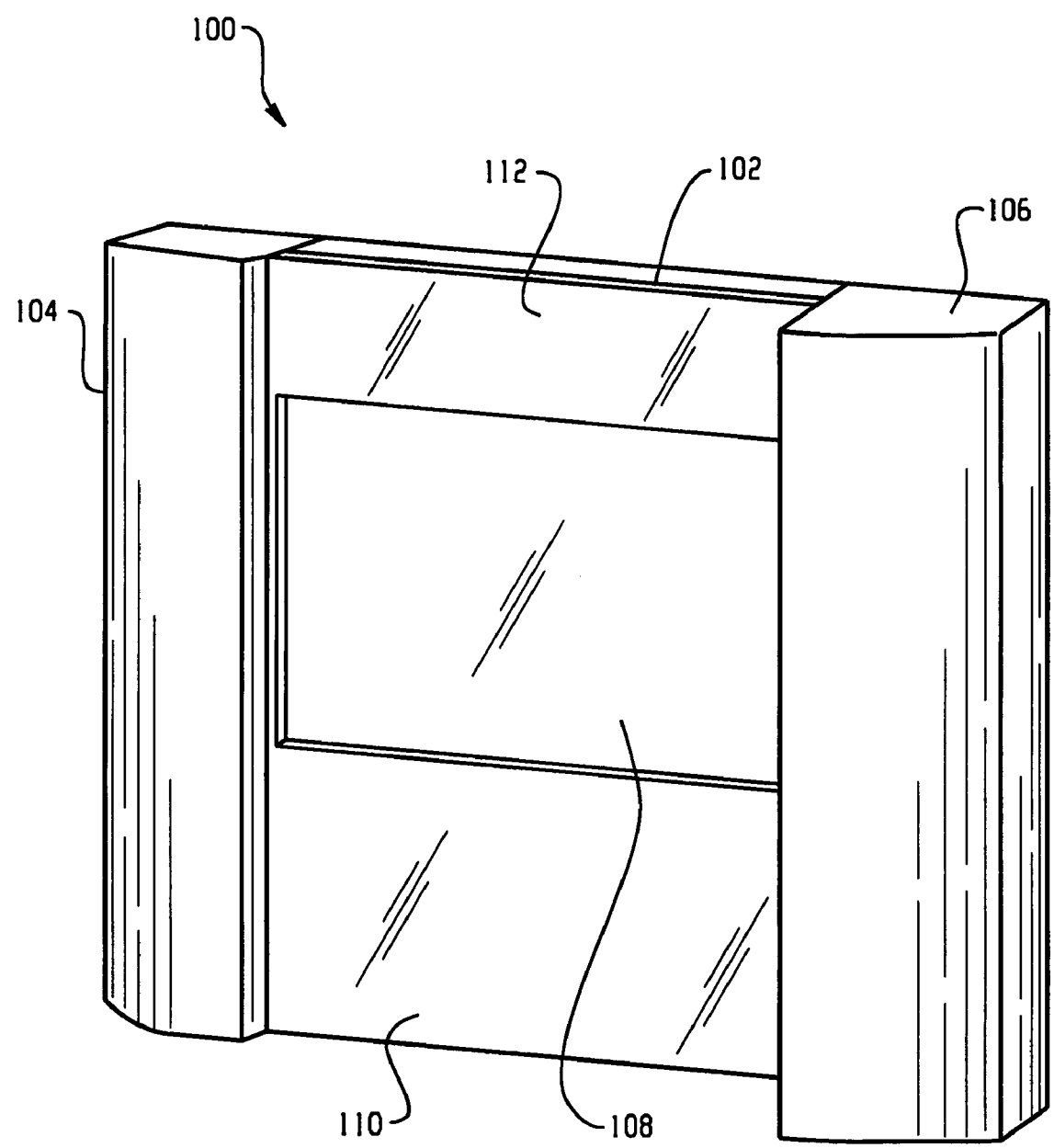
FIG. 1 is an isometric view of a terminal contemplated by an envisioned embodiment of the present invention.
Figure 4:
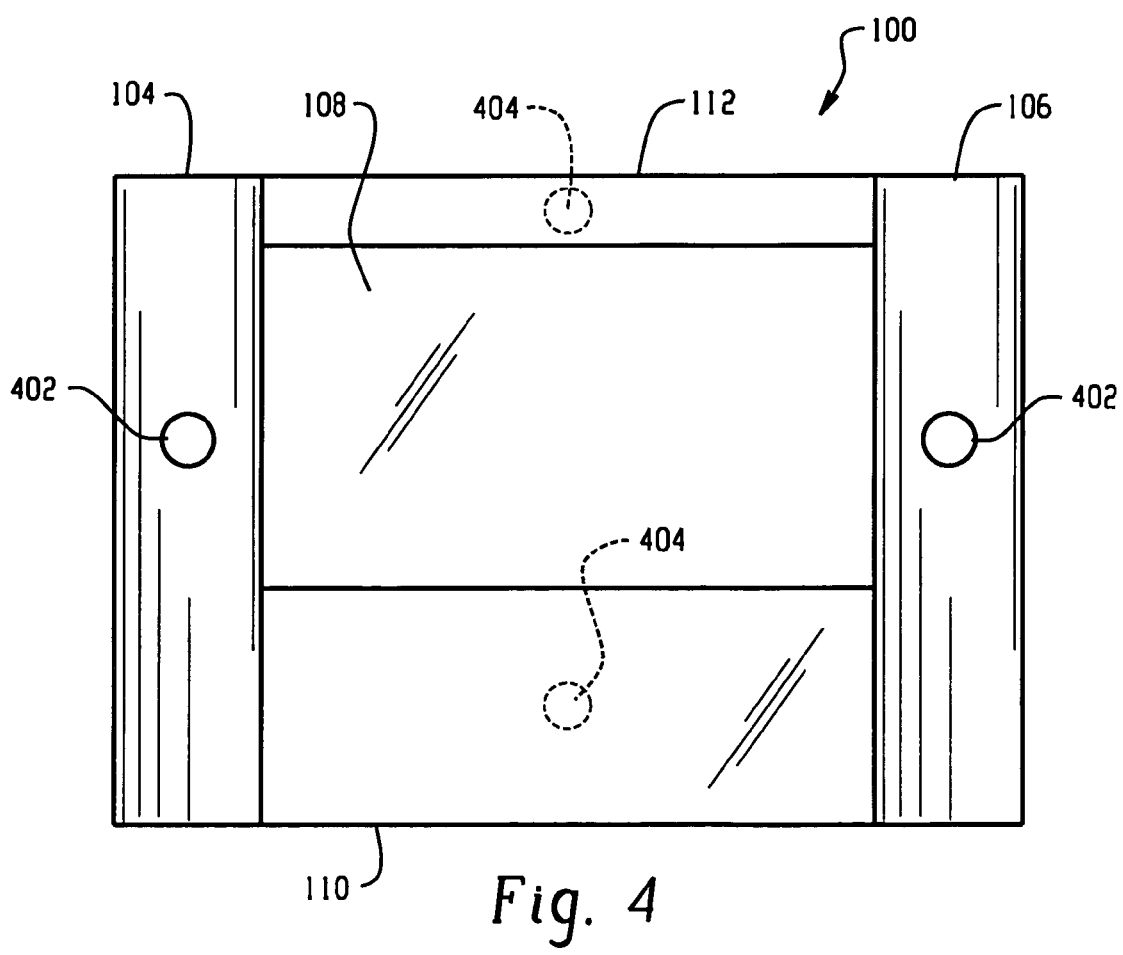
FIG. 4 is a front illustration of a terminal contemplated by a suggested embodiment of the present invention.

Referring now to FIGS. 1 and 4 there is shown a terminal 100 contemplated by a preferred embodiment of the present invention. The terminal 100 has a glass middle section 102 along with side panels 104 and 106. As suggested the glass middle section 102 is made of a hard translucent material, to prevent damage to the terminal 100 due to handling, vandalism or other violence. Underneath the translucent material are three sections: a display section 108, an opaque bottom section 110 and an opaque top section 112. The display section 108 is typically a display device, such as a television, computer monitor or liquid crystal display screen, which can be used for displaying the transaction particulars, for advertising, and/or other information. The display device 108 may also be capable of displaying static displays, or video clips employing motion an/or audio signals for both the effect and capturing attention, or a combination thereof. By using a windowing type environment as is well known in the art, the display may simultaneously display advertising messages and transaction particulars. Speakers 402 for possible use with the display device are shown as mounted in side panels 104 and 106, however the speakers 402 may be located either within any portion of the terminal 100 or at a nearby remote location. Cameras 404 or other image input apparatuses may be installed behind the bottom opaque section 110, the top opaque section 112, or in both the bottom opaque section 110 and the top opaque section 112. In addition, other monitoring sensors (not shown) such as microphones, infra red, loyalty card readers or other types of sensors, may be installed behind the bottom opaque section 110 and the top opaque section 112.

In some circumstances it may be desirable for the subject to know that monitoring may be occurring for deterrence effect. Thus, while in FIGS. 1 and 4 cameras 404 are hidden, the opacity of the bottom opaque section 110 and the top opaque section 112 may be varied. It is also contemplated that the bottom opaque section 110 and the top opaque section 112 may have differing opacity. For example it may be desired to let the subject know they are being monitored by decreasing the opacity of the top opaque section 112, while keeping the bottom opaque section very dark so the subject is unaware the monitoring is occurring from more than one location. This can be useful in situations where the subject may try to obscure the visible camera, however, by leaving one hidden the subject may still be monitored without his knowledge. This application may be particularly useful at automated teller machines where nobody else is around to insure at least one camera is not obscured by the subject being monitored.

Figure 2:
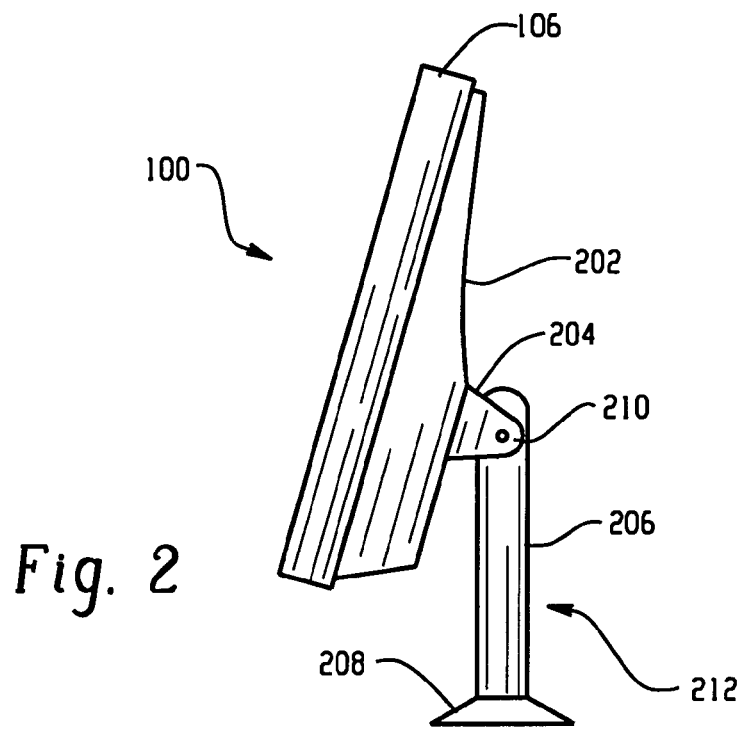
FIG. 2 is a side view of a terminal contemplated by a preferred embodiment of the present invention.
Figure 3:
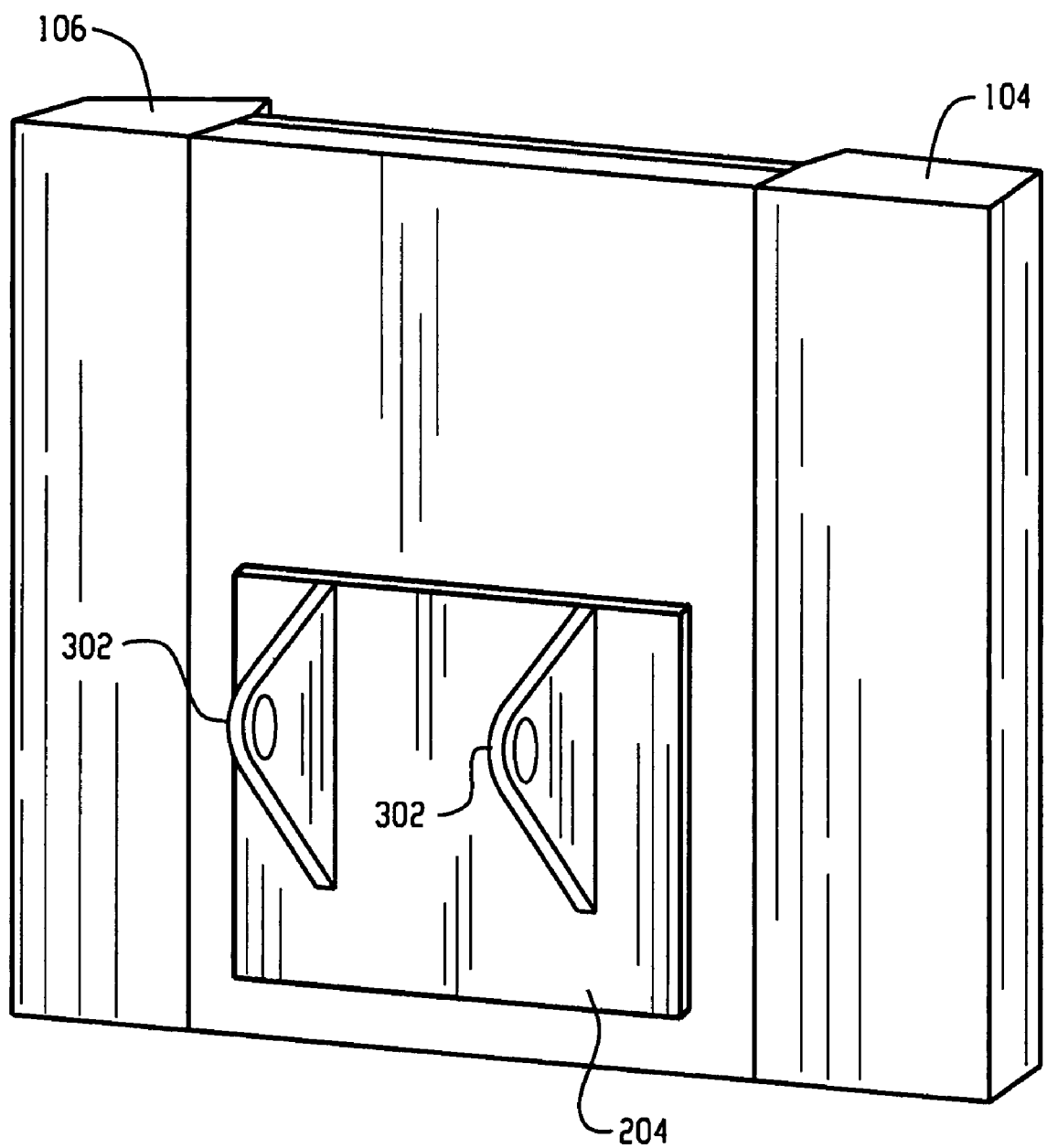
FIG. 3 is a rear view of a terminal contemplated by a suggested embodiment of the present invention.

Referring now to FIGS. 2 and 3, there is illustrated the side and rear view of the terminal 100 respectively. As shown in this embodiment, the terminal may be mounted on a stand 212. The rear of the terminal 100 comprises a back cover 204 and a mounting bracket 204. Each mounting bracket 204 has an aperture 302. The stand comprises a base 208 and a vertical piece 206. The vertical piece has an aperture 210 which can be aligned with the aperture 302 of the mounting bracket 204, enabling any common fastener, such as a nut & bolt, rod with cotter pin, rivet, or other fastener, to mount the terminal 100 onto the mounting bracket 204. Such fastener may also lock the angle of the terminal relative to the stand.

Figure 5:
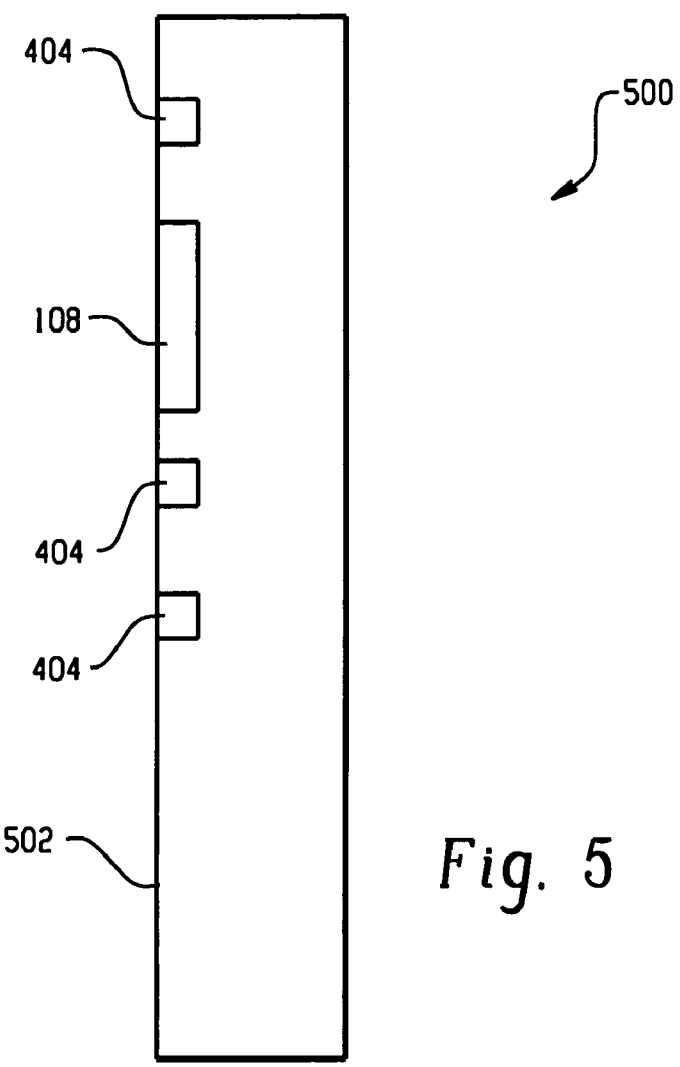
FIG. 5 is a cutaway view of a display device with several cameras mounted along a surface.

Referring now to FIG. 5 there is shown at embodiment 500 wherein a plurality of cameras 404 and the display section 108 are mounted within a surface 502. The cameras 404 are located at several different heights, and may also be located along any axis (not shown). Preferably, the cameras obtain their images at nearly the same time, increasing the chances of obtaining a photo image with sufficient detail to identify the person (not shown) involved in the transaction, whether the customer, perpetrator, or checkout clerk or teller. As the height of the person initiating or performing the transaction can vary greatly, for example a person in a wheel chair may only be three or four feet from the ground, and a very tall person may be over six feet tall, the cameras 404 may be spaced at various intervals. While this embodiment shows three cameras 404, more cameras may be used if preferred.

Figure 6:
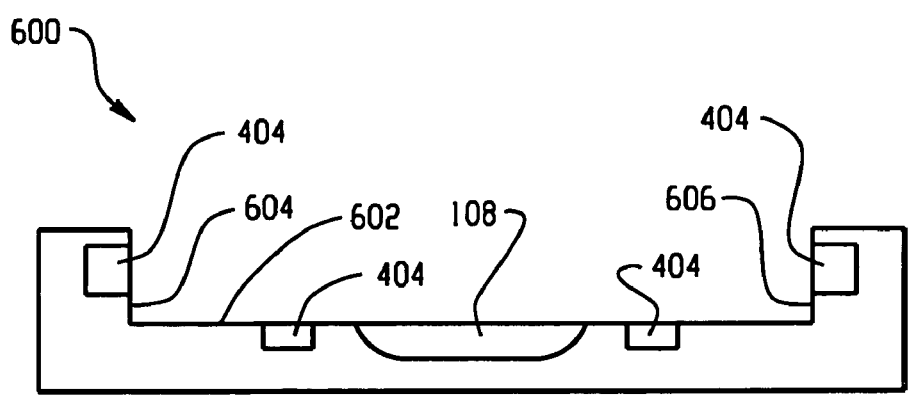
FIG. 6 is a cutaway view of a top view of an embodiment with a display device and cameras mounted on several different walls.

Referring now to FIG. 6, there is illustrated another embodiment 600 of the present invention. In this embodiment 600, cameras 404 are mounted on surfaces 602, 604 and 606. These surfaces 602, 604, 606 would typically be walls, but may be any type of structure capable of supporting cameras 404 and the display section 108. Additional cameras may be mounted above and below the display device similar to the configuration illustrated in FIG. 5. The cameras 404 in FIG. 6 may be mounted at a single height, or at several different heights. In operation, when the display section 108 displays an informational or advertising message, the person making the transaction should direct or redirect their gaze toward the display section 108. Cameras 404 on surface 602 would then obtain a frontal view of the subject while cameras 404 on surfaces 604 and 606 would obtain side views of the subject. These images would be stored along with the transaction data.

Figure 7:
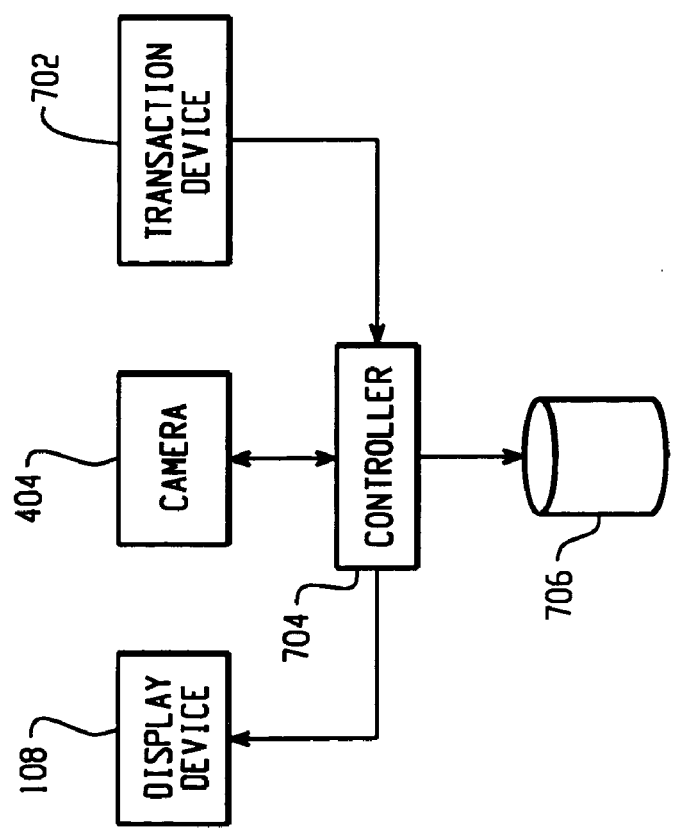
FIG. 7 is a block diagram showing an interconnection of the various major components.

Referring now to FIG. 7, there is shown a block diagram showing the interconnections of the various elements. A transaction device 702 which obtains transaction data, such as transaction number, account numbers, user identification, etc., is connected to controller 704. When the transaction device 702 begins or is processing a transaction, it notifies the controller 704. Controller 704 then activates the display device 108, or the display may already be displaying information or advertising. Display device 108 may have preset advertisements or marketing data stored therein, or controller 704 may send data to the display device 108 for display, or a connected media system may provide data for display. For example, a bank may offer a special rate for student loans that may be being displayed on an on-going basis in display device 108, or it may be stored in the display apparatus' memory or display controller and when the controller 704 activates the display device 108, an advertisement for the special rate may be displayed. However, controller 704 may also have access to other account information for a customer and may send a customized advertisement for the particular customer to the display device 108 for displaying. For example, if the customer is a homeowner, the controller 704 may send to display device 108 advertisements with current home mortgage rates or home equity rates. Similarly, if the customer has a bad payment history the controller 704 may send an advertisement to the display device 108 extolling the virtues of prompt payments. The controller also commands camera 404 to obtain photo-images. The images may be stored at the camera 404, or may be forwarded to the controller 404 for storage on data storage 706 which may be a local disk drive in controller 704, or a DVD or CD ROM, or archival disk, or the data storage 706 may be remotely located and the image sent via a network. The network may be wired or wireless. If transaction data is stored with the image, the network would preferably have some data protection capabilities such as encryption or other secure data communications. In a preferred embodiment, transaction data from transaction device 702 is stored with the images retrieved from camera 404 in a database (not shown) on data storage 706. If data storage 706 is a local disk, that is stored within the terminal, the terminal may be equipped with communications capabilities so that the data may be downloaded or transferred. In the case where data storage 706 is a removable disk such as a floppy disk, a CD ROM or a DVD, then data storage 706 merely needs to be swapped. In the preferred embodiment, the database keeps a separate record for each transaction, the record comprising the transaction data and the photo-images stored together. However, as is known in the art, pointers to the image may be stored with the transaction data and the images are stored in a separate file. It is further contemplated that more than one camera 404 may be used for obtaining images, the additional images may be stored with the transaction data as well.

Figure 8:
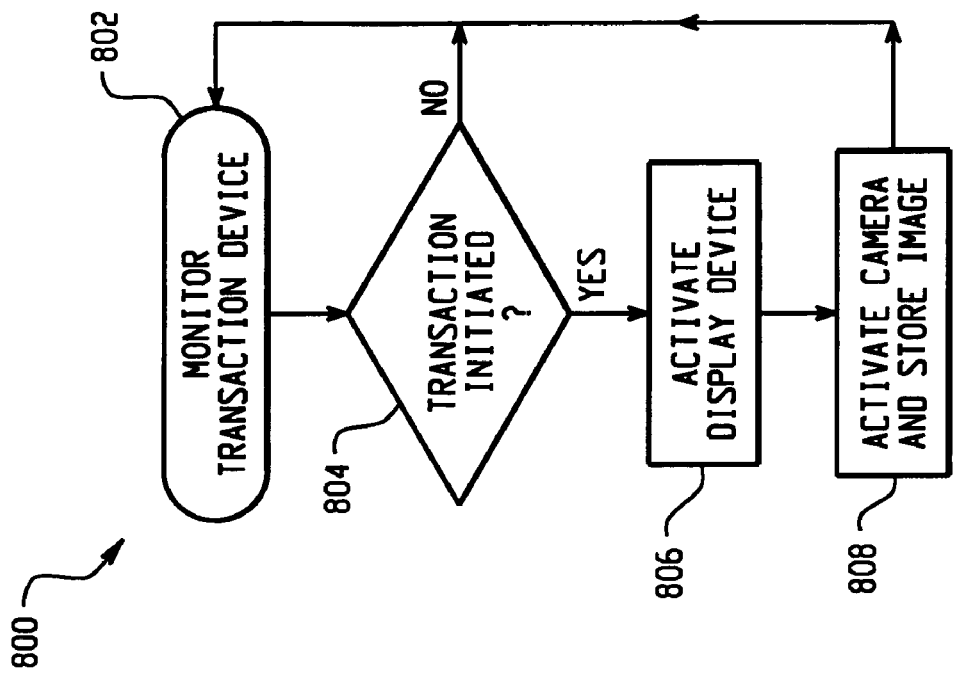
FIG. 8 is a block diagram of the steps contemplated by a method of the present invention.

Referring now to FIG. 8 there is a block diagram of a method 800 contemplated by the present invention. The method begins at step 802 by monitoring the transaction device. At step 804 it is determined whether the transaction is completed, or if the transaction is being processed. If at step 804 the transaction is completed or being processed, then at step 806 the display device is activated, and then at step 808 the camera is activated. The image obtained by the camera at step 808 is subsequently stored. Steps 806 and 808 may be implemented simultaneously, or step 806 may start before step 808, enabling the display device to attract the user's attention, causing the user to look in a certain direction before obtaining the image. If at step 804 the transaction is not completed or being processed, then the process returns to step 802 wherein monitoring of the transaction continues.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A fraud identification and recovery system comprising:
a user interface including a generally planar video display panel having a viewing area on one side thereof and at least one data input device;
a digital camera having a lens defining a field of vision relative thereto;
means for securing the digital camera proximate to the display panel on a side opposite the viewing area such that the field of vision thereof is directed to the viewing area;
means for obscuring the digital camera from perception from within the viewing area;
sensing means adapted for sensing data input on the data input device;
means for receiving digital visual content from a first storage area of an associated data storage;
display generation means for generating a display corresponding to received digital visual content on the display panel in accordance with an output of the sensing means;
means for enabling the digital camera after activation of the display generation means;
means for acquiring a digital image from the viewing area via the digital camera upon activation thereof;
means for storing an acquired digital image;
at least one additional digital camera having a lens defining a corresponding field of vision relative thereto;
means for securing each at least one additional digital camera proximate to the display panel on a side opposite the viewing area such that each camera has a field of vision thereof that is directed to a unique relative viewing area;
means for obscuring each at least one additional digital camera from perception from within the viewing area;
means for concurrently enabling each at least one additional digital camera after activation of the display generation means so as to capture users of varying height upon commencement of an associated transaction;
means for acquiring a digital image from the viewing area via each at least one additional digital camera upon activation thereof;
means for storing an acquired digital image from each at least one additional digital camera;
means for receiving user identification data of a user via the data input device; and
means for selecting the digital visual content in accordance with received user identification data so as to include informational data and advertising data, both of which are targeted to the user.

2. The system of claim 1 wherein each camera is positioned at a unique angle relative to the viewing area.

3. A method of fraud identification and recovery comprising the steps of:
securing a digital camera proximate to a display panel on a first side an associated viewing area of a device user interface such that a device user's field of vision is directed to a viewing area on an opposite side of the display panel;
obscuring a digital camera from perception from within the viewing area;
directing the digital camera to the first side of the viewing area;
sensing data input on a data input device associated with the device user interface;
receiving digital visual content from a first storage area of an associated data storage;

generating a display corresponding to received digital visual content on the display panel in accordance with an output of the sensing;

enabling the digital camera after activation of the display generation;

acquiring a digital image from the viewing area via the digital camera upon activation thereof;

storing an acquired digital image;

securing at least one additional digital camera proximate to the display panel on a side opposite the viewing area such that each at least one additional camera has a field of vision thereof that is directed to a unique relative viewing area;

obscuring each at least one additional digital camera from perception from within the viewing area;

concurrently enabling each at least one additional digital camera after activation of the display generation so as to capture users of varying height upon commencement of an associated transaction;

acquiring digital image from the viewing area via each at least one additional digital camera upon activation thereof;

storing an acquired digital image from each at least one additional digital camera;

receiving user identification data of a user via the data input device; and selecting the digital visual content in accordance with received user identification data so as to include informational data and advertising data, both of which are targeted to the user.

* * * * *